United States Patent
Oudet et al.

[11] Patent Number: 6,043,645
[45] Date of Patent: *Mar. 28, 2000

[54] MAGNETIC POSITION AND SPEED SENSOR HAVING A HALL PROBE

[75] Inventors: Claude Oudet, Besancon; Daniel Prudham, Thise, both of France

[73] Assignee: Moving Magnet Technologie SA, Besancon, France

[ * ] Notice: This patent is subject to a terminal disclaimer.

[21] Appl. No.: 08/605,840

[22] Filed: Feb. 22, 1996

Related U.S. Application Data

[63] Continuation of application No. 07/917,061, filed as application No. PCT/FR91/00973, Dec. 5, 1991, Pat. No. 5,528,139.

[30] Foreign Application Priority Data

Dec. 5, 1990 [FR] France .................. 91 00973

[51] Int. Cl.[7] .............. G01B 7/14; G01B 7/30; G01R 33/06; H01L 43/06

[52] U.S. Cl. .............. 324/207.2; 324/207.25

[58] Field of Search .............. 324/207.2, 207.21, 324/207.25, 173, 174, 251, 252

[56] References Cited

U.S. PATENT DOCUMENTS

| | | | |
|---|---|---|---|
| 3,162,804 | 12/1964 | Parsons | 324/207.2 |
| 3,194,990 | 7/1965 | Kendall | 324/207.2 |
| 4,392,375 | 7/1983 | Eguchi et al. | 324/207.4 |
| 5,394,081 | 2/1995 | Ogawa et al. | 324/207.2 |
| 5,528,139 | 6/1996 | Oudet et al. | 324/207.2 |

*Primary Examiner*—Walter E. Snow
*Attorney, Agent, or Firm*—Oblon, Spivak, McClelland, Maier & Neustadt, P.C.

[57] ABSTRACT

This invention relates to a position sensor featuring a stator defining an air gap inside of which a mobile magnet integral with a coupling shaft moves. The sensor features a Hall probe for measuring the variation of the induction in an air gap. The stator is formed of a first stationary part and a second part which is either stationary or mobile, the two parts defining between them a main air gap in which the part of the mobile element moves. The mobile element exhibits at least two adjacent thin parts magnetized crosswise in alternate directions, the magnetized parts being made of a material exhibiting in the entire working area a practically linear demagnetization characteristic and reversible permeability close to that of the air. The stationary part exhibits at least two secondary air gaps approximately perpendicular to the main air gap in which the mobile element moves. The Hall probe is housed in one of the secondary air gaps. The L/E ratio is greater than 6, L designation the width of a magnetic pole and E designating the width of main air gap.

6 Claims, 5 Drawing Sheets

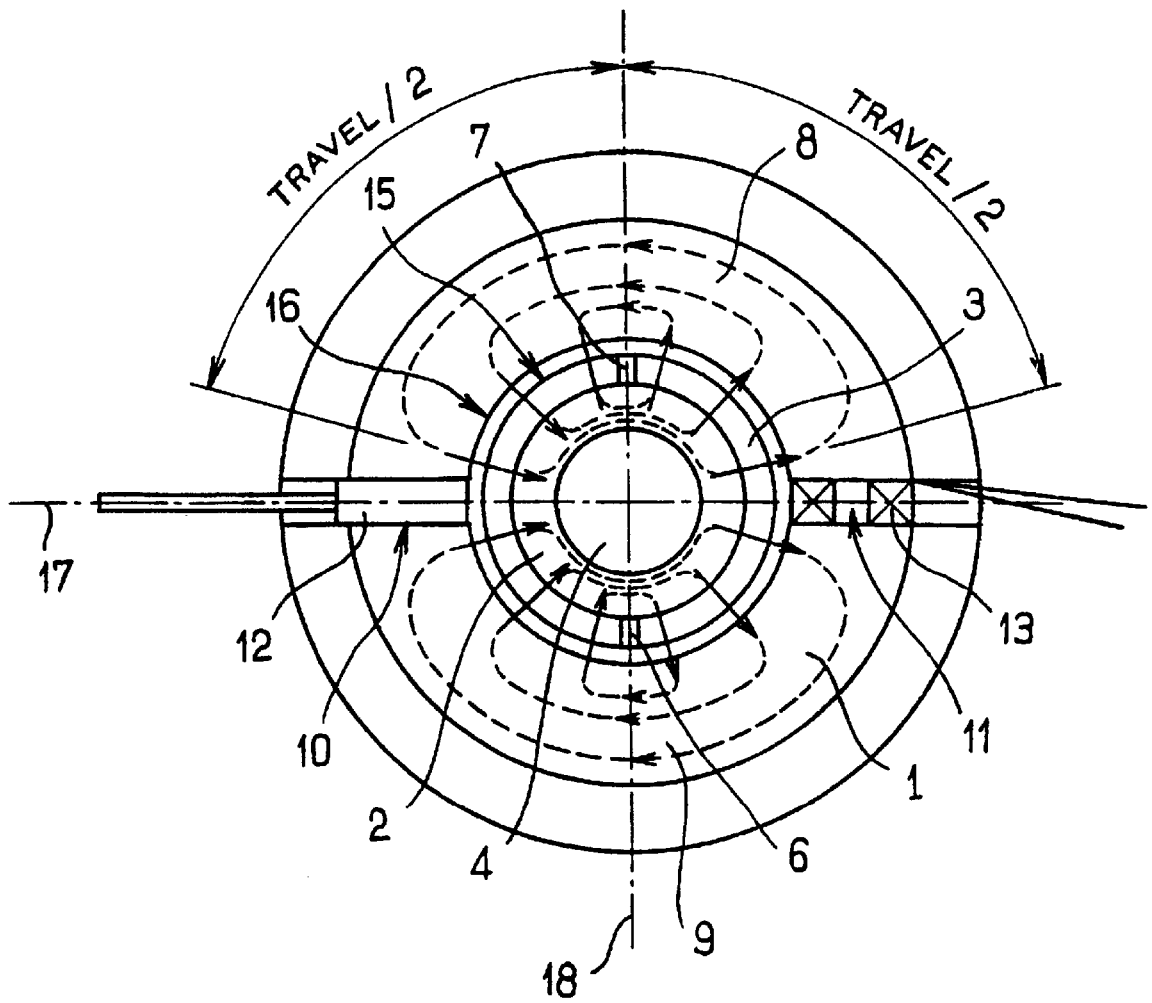
FIG_3

MAGNETIC POSITION AND SPEED SENSOR HAVING A HALL PROBE

This is a Continuation, of application Ser. No. 07/917,061 filed on Oct. 1, 1992, now U.S. Pat. No. 5,528,139 which was filed as A 371 of PCT Application No. PCT/FR91/00973 on Dec. 5, 1991.

BACKGROUND OF THE INVENTION

1. Field of the Invention

This invention relates to a magnetic position sensor, and, according to a variant, a magnetic position and speed sensor.

2. Discussion of the Background

Position sensors using Hall probes detecting the magnetic flux generated by a magnet by relative movement relative to the Hall probe are known in the prior art. In particular, French patent 2624966 describes a coder for a print wheel comprising a Hall-effect linear detector and a permanent magnet mounted in a nonferrous metal shaft exhibiting a ring forming a conductive flux spiral molded in the wheel and encircling the shaft. The angular position of the print wheel is determined in absolute value by the amplitude of the signal relative to the transition point of the spiral. In another embodiment, a second Hall-effect detector is placed on the shaft, being opposite to the first detector to provide a reinforced signal.

The sensors thus produced do not exhibit a signal which is actually linear, and, in the prior art, this drawback has been remedied by digitizing the signal delivered by the Hall probe and by processing the signal by data-processing means.

It has also been proposed in the prior art to remedy the defect of linearity of magnetic position sensors by complex geometries. During the European colloquium on the "modern magnets and new machines with magnets" which was held in Grenoble on Jun. 13 to 15, 1990, a position sensor delivering an output signal approximately proportional to the angular position was exhibited. This sensor comprised a magnetized ring of elliptical shape according to a first embodiment, or an original qualified geometry consisting of two arcs of a circle. The linearity error is thus cancelled by the eccentricity. If, on the theoretical plane, this solution is advantageous, it is technically difficult to achieve for sensors produced industrially in large scale. The production cost is thereby excessive for many applications.

SUMMARY OF THE INVENTION

The object of this invention is to remedy these drawbacks by proposing an angular or linear position sensor of low production cost, exhibiting a linearity error less than one percent and whose extent of measurement is slightly less than the length of a magnetic pole.

The position sensor according to this invention comprises a stator defining an air gap inside of which a mobile magnet integral with a coupling means moves. The sensor further comprises two secondary air gaps approximately perpendicular to the main air gap, a Hall probe measuring the variation of the induction in at least one of the secondary air gaps. The stator consists of a first stationary part and a second part which can be either stationary or mobile. The two parts define between them said air gap in which the magnetized part of the mobile element moves. The mobile element exhibits at least two thin parts magnetized crosswise in alternate direction made of a material exhibiting in the entire working area a practically linear demagnetization characteristic and a reversible permeability close to that of the air. The stationary stator part exhibits two secondary air gaps perpendicular to the air gap in which the mobile element moves, a Hall probe being housed in said secondary air gap. The L/E ratio is advantageously greater than 6, and preferably greater than 10, where L designates the linear width of the magnetic pole in the case of a linear sensor, or the length of the arc corresponding to the average radius of the pole, in the case of a rotary sensor and where E designates the width of the air gap. According to a particular embodiment, the mobile element comprises only a single thin part magnetized crosswise, exhibiting the shape of a tile extending on 120° for sensor with a rotary cylindrical rotor or mobile in translation, or the shape of a half-disk for a flat rotary sensor. The output signal is, however, of weaker amplitude and poorer quality than in the embodiment using at least two magnetized parts.

The Hall probe produces an electric signal proportional to the flux density or induction which goes through it. So that this probe delivers a signal as a linear function of the angular or linear position, it is necessary to place it in a magnetic field which varies as linearly as possible with the position.

In the sense of this patent, stator designates the group of components of the circuits with high magnetic permeability, formed by a stationary part, and a second part which in most cases is also stationary, but in some particular cases is integral with the mobile magnet.

According to a particular embodiment, the stator consists of a first stationary part and a second part integral with the magnetized part of the mobile element. Although this embodiment considerably increases the characteristic inertia of the sensor, it makes it possible to reinforce the mechanical strength of the mobile element and therefore optionally to use fragile magnetic materials.

According to a first variant, the stator consists of two coaxial rings, the outside ring comprising at least two radial air gaps in one of which the Hall probe is placed, the mobile element consisting of a magnetized cylinder coaxial with said stator rings and mobile in rotation around the axis of symmetry. The travel of the mobile element is C/2 on both sides of a median position in which the transition zone between the two magnetized parts of the mobile element is in the plane perpendicular to the plane of symmetry of the radial secondary air gap in which the Hall probe is housed, C being slightly less than π.

This embodiment makes it possible to produce small-sized sensors delivering an output signal proportional to the angular position with a great precision and over a significant travel.

According to a second variant, the mobile element consists of a thin disk exhibiting two parts magnetized crosswise each extending over approximately π, the stator consisting of a first stationary part exhibiting a secondary radial air gap in which a Hall probe is housed and a second stationary or mobile part consisting of a disk of a soft magnetic material.

Advantageously, the air gap is defined by a thrust ball bearing placed between the mobile element and the stationary stator part. The attraction between the magnetized parts of the mobile element and the stationary stator part assures the positioning and the centering of the mobile element. The movement produced by this attraction is limited by the thrust ball bearing which makes it possible, however, to maintain a certain alignment flexibility and leads to a great resistance to shocks and vibrations.

According to a particular embodiment, the stationary stator part comprises two Hall probes each housed in one of said secondary air gaps.

By summing the signals delivered by each of said Hall probes, the possible geometry defects of the position sensor are attenuated.

According to a third variant, the stator consists of a stationary part exhibiting three stator poles and a second part defining between them an air gap in which the mobile element moves linearly.

According to a particular embodiment, the stationary stator part further comprises a sensing coil of the time variation of the magnetic flux housed in one of the secondary air gaps.

This coil delivers an electric signal proportional to the relative speed of the mobile element relative to said coil.

Advantageously, the stationary stator part further comprises a housing for a temperature probe.

This probe makes it possible to compensate the variations of the characteristics of the magnetized parts and/or Hall probes under the effect of the temperature and therefore to use components of moderate cost. This temperature probe can be housed in one of the secondary air gaps.

BRIEF DESCRIPTION OF THE DRAWINGS

This invention will be understood better from reading the following description, relating to several embodiments not constituting in any way a limitation of the scope of the invention and referencing the drawings where:

FIG. 3 represents a view in median section of the same sensor in a different position.

DESCRIPTION OF THE PREFERRED EMBODIMENTS

Figure 2:
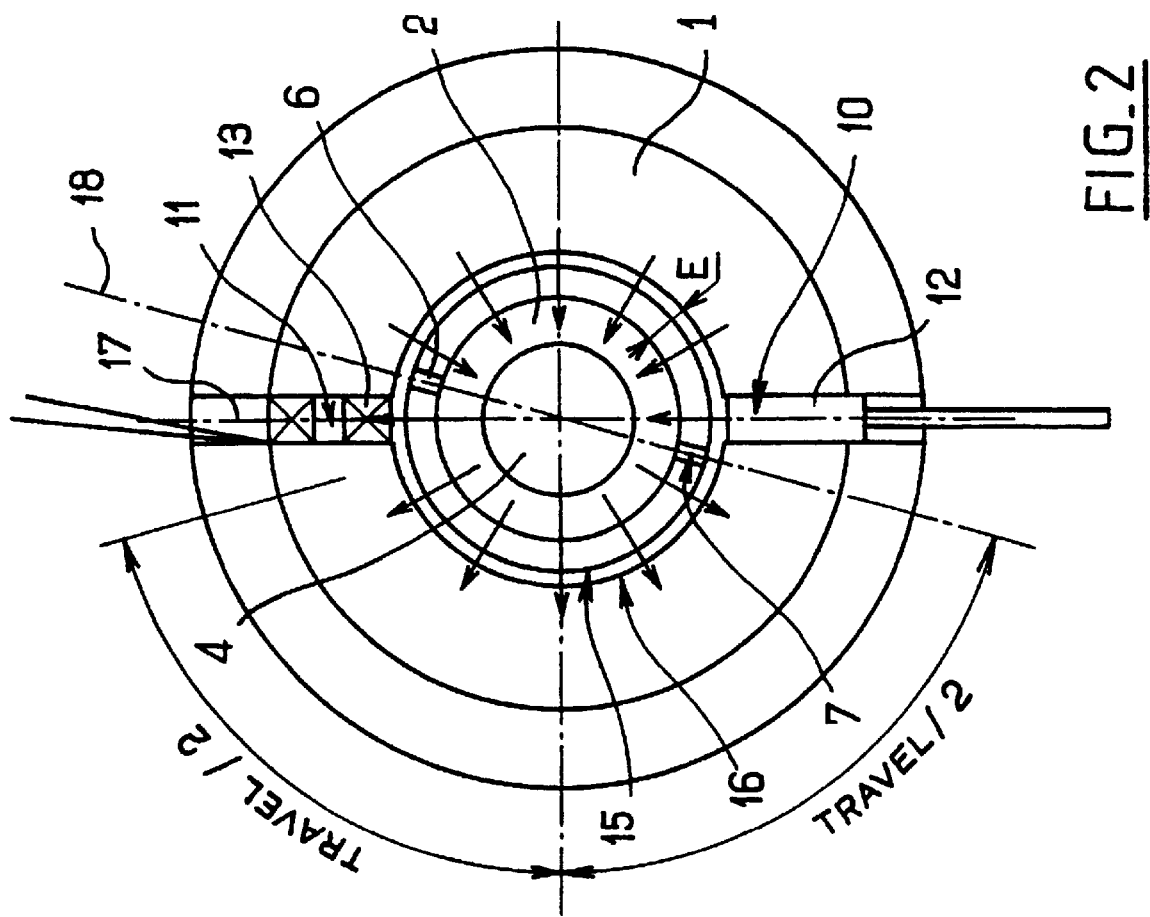
FIG. 2 represents a view in median section of the same sensor.
Figure 1:
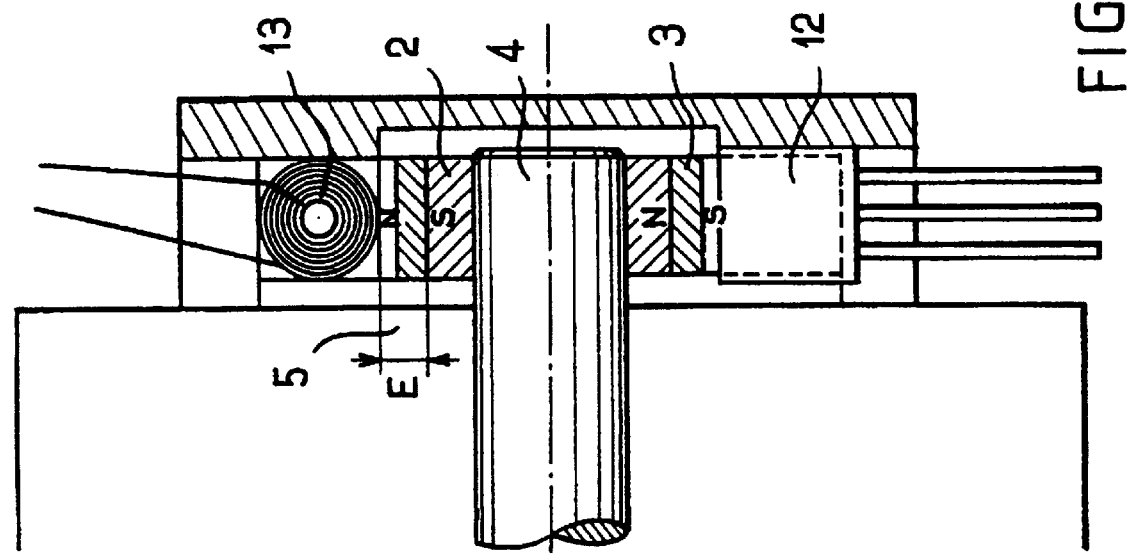
FIG. 1 represents a view in axial section of an angular position and speed sensor.

The sensor represented in FIG. (1) comprises a stator structure comprising a first stationary part (1) and a second part (2) integral with a tubular magnet (3). Two stator parts (1), (2) consist of a soft magnetic material with high permeability and low magnetic hysteresis. By way of example, the stator parts can be made of annealed pure iron or of an annealed iron-nickel alloy of the ANHYSTER D or MUMETAL type marketed by the Creusot Loire company, or else of sintered iron or iron-nickel.

Tubular magnet (3) is made by joining two parts magnetized radially in opposite direction or else by magnetization of a tubular part of isotropic or anisotropic molded samarium cobalt $\frac{1}{5}$ with radial orientation. Magnet (3) exhibits two pairs of poles, i.e. at its periphery, a north pole is seen on an angle slightly less than 180° and a south pole on the sector diametrically opposite, of an angle also slightly less than 180°. Two transition zones (6), (7), whose dimensions depend on the quality of the magnetization material and/or production techniques of this mobile element, are placed between the two pairs of poles.

The ring constituting second stator part (2) and tubular magnet (3) are assembled by gluing and are mounted on a coupling shaft (4).

Stationary stator part (1) is separated from mobile stator part (2) by an air gap (5) of a length E. As represented in FIG. 2, stationary stator part (1) consists of two half-rings (8), (9) made of a soft magnetic material preferably with high permeability and low hysteresis. Stator part (1) exhibits two radial cavities (10), (11) constituting secondary air gaps and in which a Hall probe (12) and an electric coil (13) are housed respectively. The length of these radial air gaps measured perpendicularly to the plane of symmetry passing through the center of the two air gaps is on the order of a millimeter.

Hall probe (12) is preferably of the type with an amplifier incorporated in the same housing, which makes it possible to have only three wires and to have an electric signal of greater amplitude, not very sensitive to electric interferences. By way of example, the Hall probe is of the UGN 3503 type marketed by the Sprague company.

Electric coil (13) consists of a winding of axis perpendicular to the faces of the stator defining secondary air gap (11). This winding comprises several hundred turns of copper wire.

Main air gap (5) will be selected as small as possible, for example, for a sensor of average radius R of 5 millimeters at the center of the rotor and for a magnetized part of a thickness of 1 millimeter, the play between outside surface (15) of magnetized part (3) and inside surface (16) of stator part (1) will be on the order of 0.2 millimeter. In this example, the L/E ratio is 13, L designating the width of a magnetic pole L being slightly less than 5 mm×π=15.7 mm E designating the dimension of air gap (5) or 1 mm+0.2 mm=1.2 mm.

In the position represented in FIG. 2, diametral plane (18) of the magnet passing through transition zones (6), (7) is angularly close to plane of diametral symmetry (17) of the stator passing through the center of secondary air gaps (10), (11). The difference is about 15°. Under these conditions, the major part of the flux produced by a pair of poles is enclosed through the secondary air gaps (10), (11) with that produced by the other pair of poles. If the mechanical embodiment is good, each air gap conveys an equal flux, and the inductions in these two secondary air gaps are equal and maximum. For an angle less than 15°, transition zone (6), (7) approximates in an excessive way secondary air gap, respectively (10), (11), and a magnetic discontinuity disturbing the response of the sensor results from this.

In the position represented in FIG. 3, diametral plane (18) of the magnet passing through transition zones (6), (7) and plane of diametral symmetry (17) of the stator passing through the center of secondary air gaps (10), (11) form an angle of 90°. In this case, no flux passes through secondary air gaps (10), (11) and the induction is zero there. For a larger angle on the order of 165°, it is clear that the induction is equal in amplitude and sign opposite to the induction corresponding to FIG. 2. Thanks to the large L/E ratio and the characteristic of the selected magnet, the induction varies linearly as a function of the angular position on a range between 15° and 165°, or on about 150°. Stationary stator part (1) and mobile stator part (2) should have a sufficient cross-sectional area not to saturate at any point. Moreover, to obtain a good linearity, the reluctance of the stator should be low considering that of the secondary air gaps. It is clear that if the radius of magnet (3) is increased for the same dimension of the air gap, and for the same width of transition zone (6), (7), the travel with linear response is increased and can reach values slightly less than 180°, on the order of 170°.

In the absence of a limit stop of the travel of the mobile element, the response of the sensor on a complete turn resembles a symmetrical sawtooth.

To reduce the driving torque of the sensor due to the variation of the operating point of the magnet and to reduce the parasitic disturbances produced by the sensor on the measured system, it is preferable to reduce the variation of the operating point of the magnet and consequently to reduce the reluctance of the air gaps in which the probe or probes are placed. For this purpose, it is advisable to choose a thin probe and to increase the surface of this secondary air gap.

Figure 4:
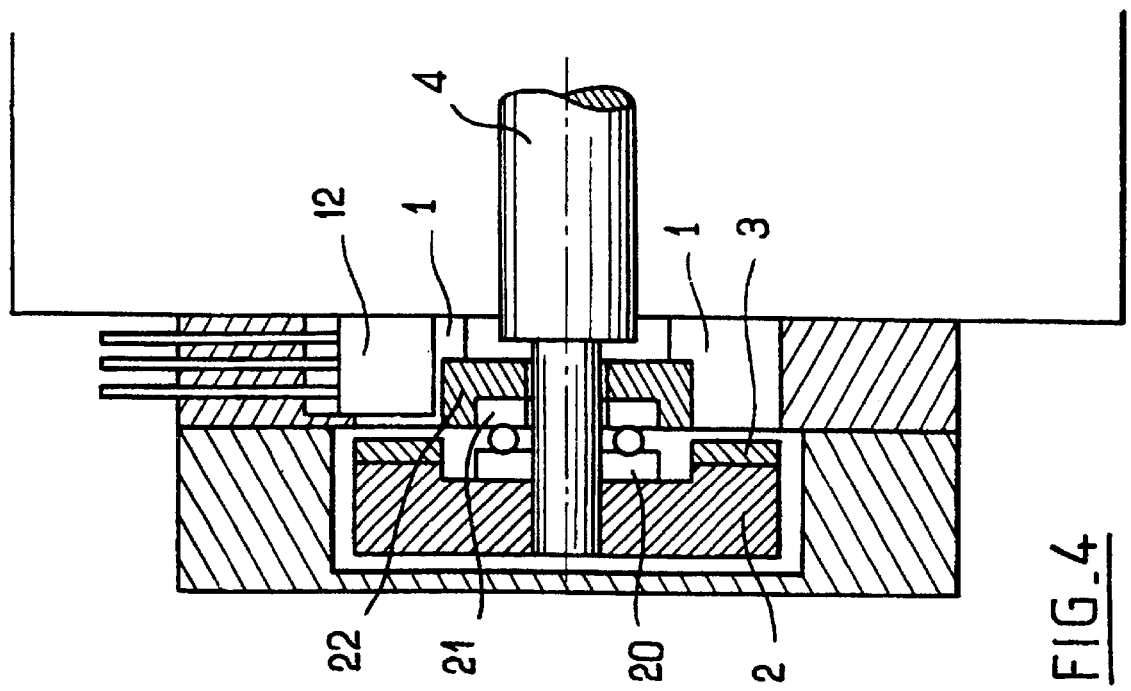
FIG. 4 represents a view in axial section of a second embodiment of an angular sensor.

FIG. 4 represents a view in median section of another embodiment of a sensor according to the invention. As in the example described above, the stator consists of a stationary part (1) whose shape is approximately identical with the shape of the stationary part described above, and a disk-shaped mobile part (2). Magnet (3) consists of two half-washers magnetized crosswise in opposite direction. Magnet (3) is glued on one of the faces of mobile stator part (2). By way of example, the outside diameter of the magnet is 16 millimeters and the inside diameter is 8 millimeters, its thickness is one millimeter and the axial play between the magnet and the closest surface of stationary stator part (1) is about 0.3 millimeter. The average radius of magnet (3) is 6 millimeters and the ratio between the width of the pole and the dimension of the air gap measured between the two stator parts is about 15. Each magnetic pole has the shape of a circular sector of about 180° of opening. The magnetic forces attract the mobile element against stationary stator part (1). To prevent the contact between the mobile parts and the stationary part, the axial movement is limited by a thrust ball bearing (20) whose ring (21) is magnetically isolated from stator (1) by a nonmagnetic part (22). The positioning and the guiding can be assured exclusively by the forces of magnetic attraction and thrust ball bearing (20), excluding any other mechanical guide. A great resistance to shocks and vibrations, and a possibility of self-adaptation to alignment defects of coupling shaft (4) result from this.

Figure 5:
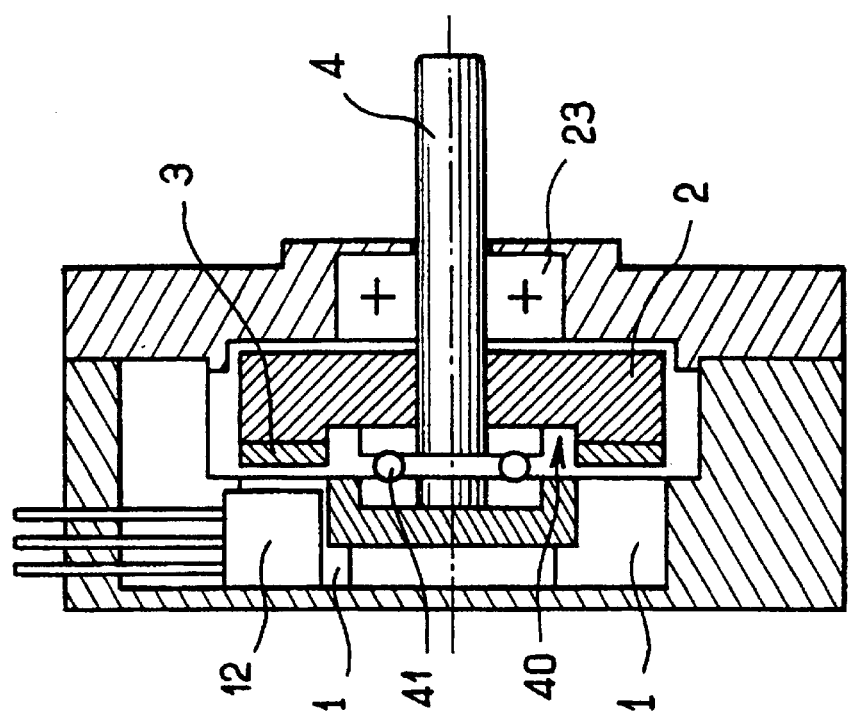
FIG. 5 represents a view in axial section of a third embodiment.

FIG. 5 represents a view in section of a variant of the preceding embodiment. The position of the stator and the rotor have been reversed to simplify the assembly. Coupling shaft (4) is guided laterally, but not axially, by a bearing (23).

In an extreme case, mobile part (2) exhibits a bore (40) deep enough to make possible the housing of thrust ball bearing (41). In this case, stator (1) can consist of a solid disk exhibiting a single diametral slot.

In this case, the two air gaps are placed in the extension of one another and are reduced to a single slot. As a result, the concept of "two air gaps" will be extended in the sense of this patent to such a slot.

Figure 6:
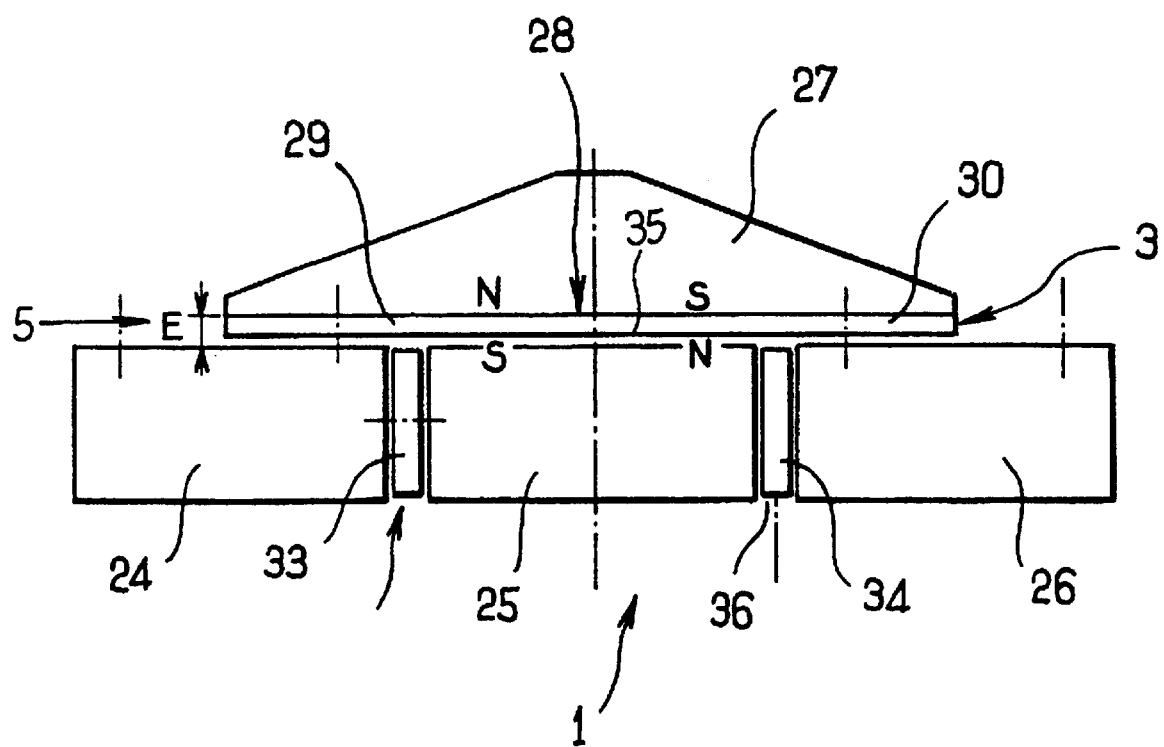
FIG. 6 represents a view in cross section of a linear sensor.

FIG. 6 represents a view in section of a linear actuator. Stationary part (1) of the stator exhibits three magnetic poles, respectively (24, 25, 26). Mobile stator part (27) is integral with a thin magnet (28) exhibiting two pairs of poles (29, 30) in opposite directions. Stationary stator part (1) exhibits a first secondary air gap (31) in which a Hall probe (33) is housed and a second secondary air gap (36) in which either an electric coil (34) or a second Hall probe is housed. The median plane of secondary air gaps (31, 36) is perpendicular to the plane of main air gap (5). The mobile element moves linearly, the useful travel being limited by two end positions in which transition zone (35) between the two pairs of poles of magnet (3) reaches the vicinity of one or the other of secondary air gaps (31), (36), "in the vicinity" meaning at a distance corresponding approximately to the width of main air gap (5).

In the example described, the thin magnet is plane. It can, of course, be made in various shapes, in particular in the shape of a tile or cylinder whose axis corresponds to the axis of the linear movement of the mobile element, stator parts (24, 25, 26) then being in the form of cylindrical washers.

Figure 7:
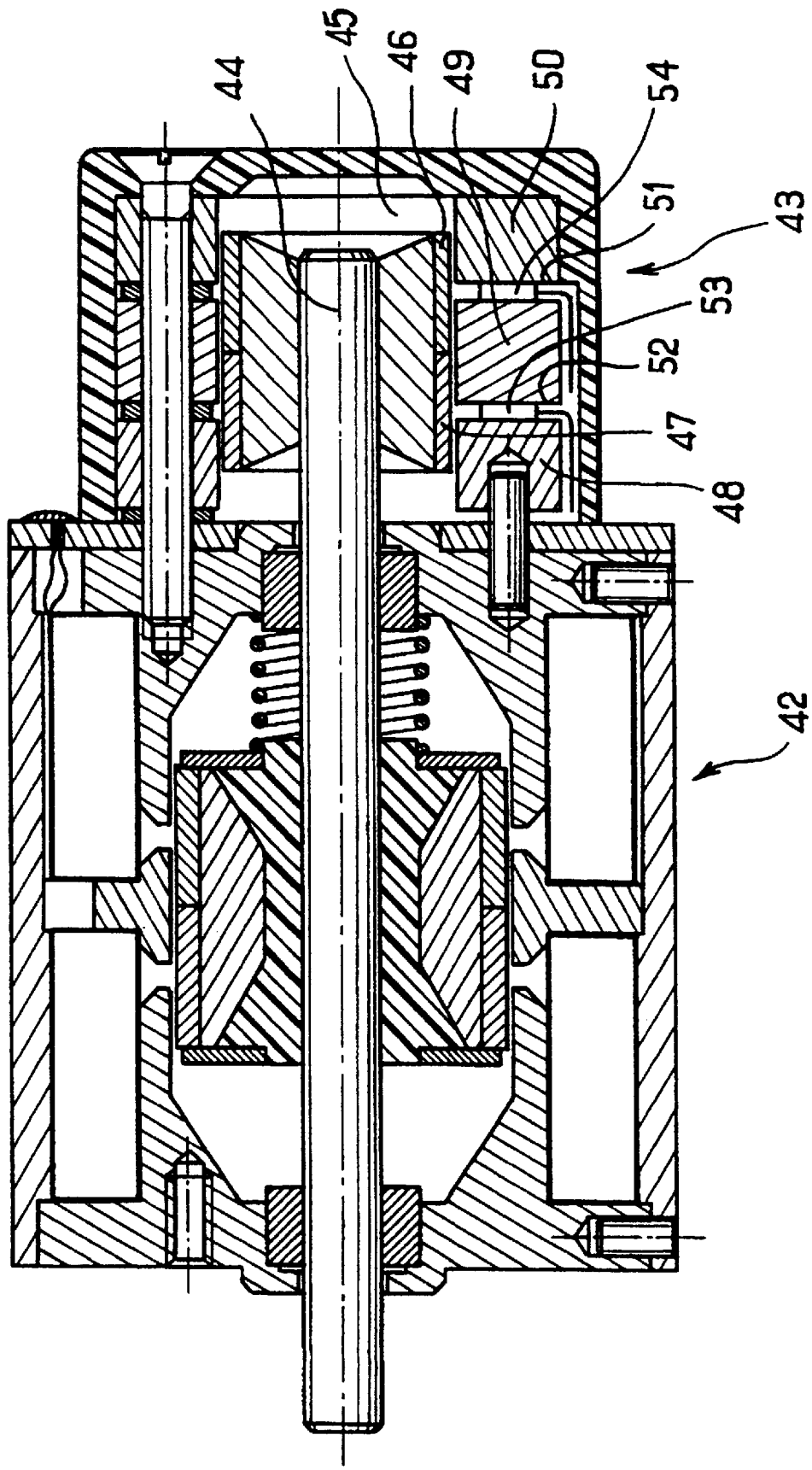
FIG. 7 represents a view in section of a linear sensor variant.

FIG. 7 represents a view in section of a linear sensor joined to an actuator (42) whose structure and operation are not explained.

Sensor stage (43) exhibits an axial symmetry relative to longitudinal axis (44). It comprises a mobile element (45) integral with the axis of the actuator and comprising two annular magnets (46, 47) oriented radially, in opposite directions. The stator consists of three ferromagnetic parts (48, 49, 50) of annular shape. In this embodiment, the L/E ratio is slightly greater than 3. Two air gaps (51 and 52) extending radially make possible the positioning of Hall probes (53), (54).

This invention is not at all limited to the examples above, but extends, on the contrary, to all the variant embodiments.

We claim:

1. A position sensor comprising a stationary stator;

a mobile element located outside of the stationary stator, and comprising:
   a coupling shaft; and
   a magnet formed integral with the coupling shaft;

a first air gap being formed between the stationary stator and the mobile element;

two secondary air gaps formed in the stationary stator, each of the two stationary air gaps being approximately perpendicular to the first air gap; and a Hall probe housed in a first of the two secondary air gaps;

wherein a ratio L/E is greater than 3, where L designates a width of a magnetic pole and E designates a width of the first air gap.

2. The position sensor according to claim 1, wherein L/E is greater than 6.

3. A position sensor comprising:

a stationary stator;

a mobile element located outside of the stationary stator, and comprising:
   a coupling shaft; and
   a magnet formed integral with the coupling shaft;

a first air gap being formed between the stationary stator and the mobile element;

two secondary air gaps formed in the stationary stator, each of the two stationary air gaps being approximately perpendicular to the first air gap; and a Hall probe housed in a first of the two secondary air gaps;

wherein a sensing coil is housed in a second of the at least two secondary air gaps.

4. A position sensor comprising:

a stationary stator;

a mobile element located outside of the stationary stator, and comprising:
   a coupling shaft; and
   a magnet formed integral with the coupling shaft;

a first air gap being formed between the stationary stator and the mobile element;

two secondary air gaps formed in the stationary stator, each of the two stationary air gaps being approximately perpendicular to the first air gap; and a Hall probe housed in a first of the two secondary air gaps;

wherein the magnet comprises adjacent thin parts, magnetized crosswise in alternate direction.

5. A position sensor comprising:

a stationary stator;

a mobile element located outside of the stationary stator, and comprising:

a coupling shaft; and a magnet formed integral with the coupling shaft;

a first air gap being formed between the stationary stator and the mobile element;

two secondary air gaps formed in the stationary stator, each of the two stationary air gaps being approximately perpendicular to the first air gap; and a Hall probe housed in a first of the two secondary air gaps;

wherein the magnet comprises a thin disk exhibiting two parts magnetized crosswise each extending over about π.

6. A position sensor comprising:

a stationary stator;

a mobile element located outside of the stationary stator, and comprising:

a coupling shaft; and a magnet formed integral with the coupling shaft;

a first air gap being formed between the stationary stator and the mobile element;

two secondary air gaps formed in the stationary stator, each of the two stationary air gaps being approximately perpendicular to the first air gap;

a Hall probe housed in a first of the two secondary air gaps; and a temperature probe, formed in a housing in the stationary stator.

* * * * *